No. 645,773. Patented Mar. 20, 1900.
F. H. WOLFGANG.
VEHICLE COVER.
(Application filed Jan. 30, 1900.)

(No Model.) 2 Sheets—Sheet 1.

WITNESSES:

INVENTOR
Fred H. Wolfgang
BY
ATTORNEYS

No. 645,773. Patented Mar. 20, 1900.
F. H. WOLFGANG.
VEHICLE COVER.
(Application filed Jan. 30, 1900.)
(No Model.) 2 Sheets—Sheet 2.
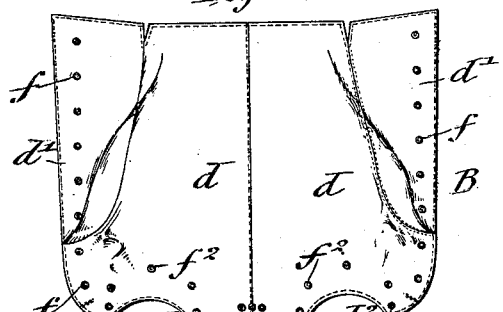
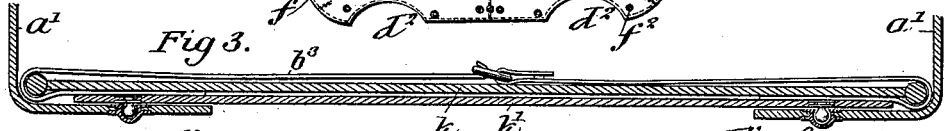
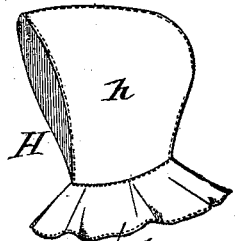
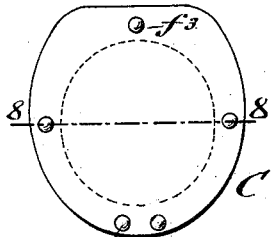
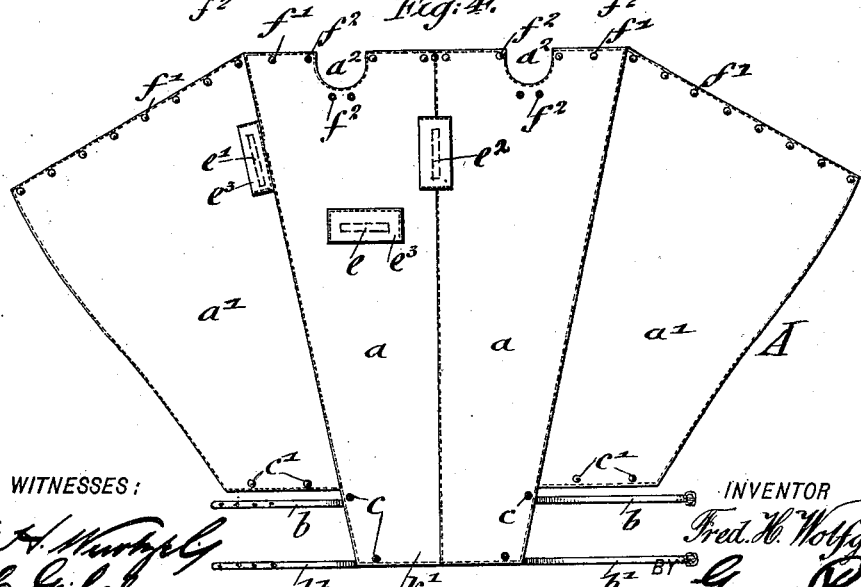
WITNESSES:
INVENTOR
Fred. H. Wolfgang,
BY
ATTORNEYS.
THE NORRIS PETERS CO., PHOTO-LITHO., WASHINGTON, D. C.

UNITED STATES PATENT OFFICE.

FREDERICK H. WOLFGANG, OF NEW YORK, N. Y.

VEHICLE-COVER.

SPECIFICATION forming part of Letters Patent No. 645,773, dated March 20, 1900.

Application filed January 30, 1900. Serial No. 3,295. (No model.)

*To all whom it may concern:*

Be it known that I, FREDERICK H. WOLFGANG, a citizen of the United States, residing in the city of New York, borough of Brooklyn, and State of New York, have invented certain new and useful Improvements in Vehicle-Covers, of which the following is a specification.

This invention relates to an improved cover which is adapted to be used for uncovered vehicles of all kinds, and more especially for sporting-vehicles, whether drawn by horses or motor-driven; and the invention consists of a vehicle-cover composed of a front portion having longer middle sections and shorter side flaps, a rear portion, fastening devices for connecting the adjacent edges of the front and rear portions, and means for connecting the extended ends of the front portion with the dashboard of a vehicle; and the invention consists, further, in certain additional details of construction and combinations of parts, which will be more fully described hereinafter and finally pointed out in the claims.

Figure 1:
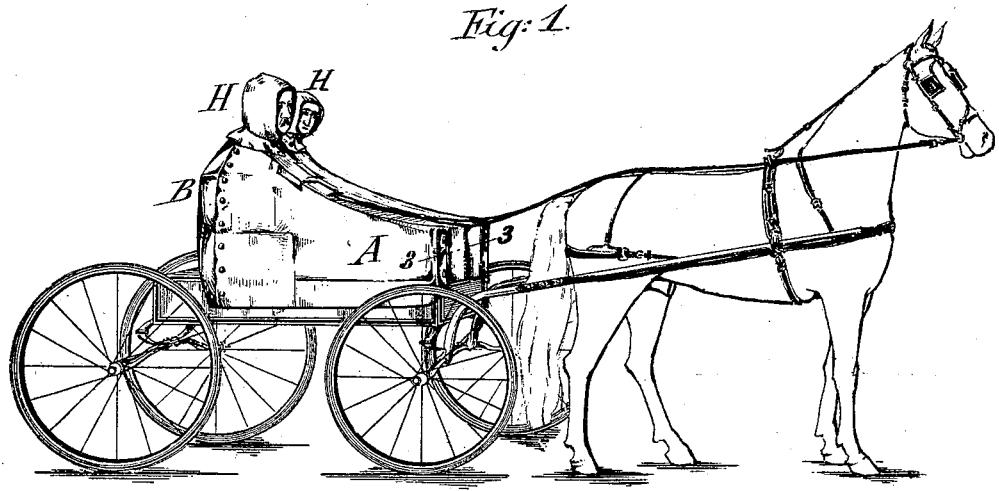
Figure 2:
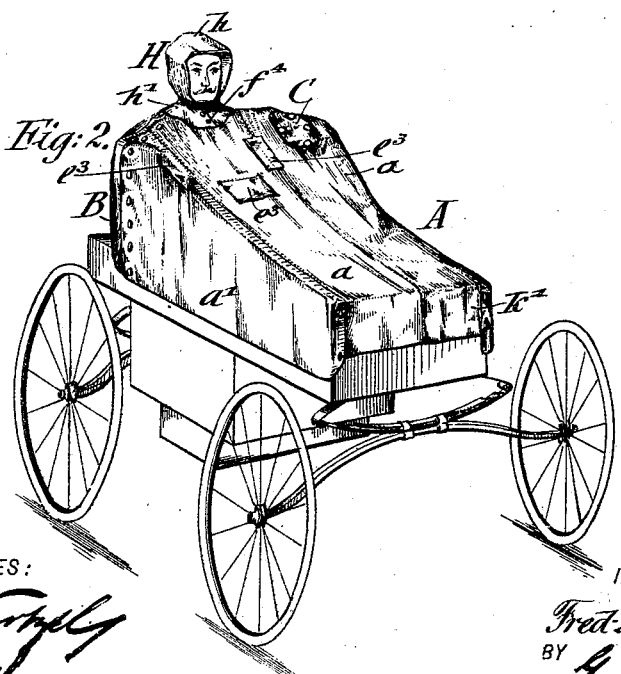

In the accompanying drawings, Figure 1 is a perspective view of a horse-drawn vehicle, showing my improved cover in position with two persons seated in the vehicle. Fig. 2 is a perspective view of an automobile vehicle, showing the cover also in position, but with only one person in the vehicle. Fig. 3 is a horizontal section on line 3 3, Fig. 1, showing the means of attaching the dashboard covering-flap to the dashboard. Fig. 4 is a plan view of the main portion of the vehicle-cover, shown as flattened out in one plane, so as to show the construction of the same. Fig. 5 is plan view of the rear portion, also without a flap. Fig. 6 shows the covering for the neck-opening of my improved vehicle-cover. Fig. 7 is a perspective view of the hood which is used with my improved cover, and Fig. 8 is a detail section showing the fasteners by which the connection between the main portion and the rear portion and the neck-covering is made.

Similar letters of reference indicate corresponding parts.

Many sporting and other vehicles drawn by horses or automobile are made without a cover, so that consequently the persons riding in the same are unprotected in case of rain. This is not only disagreeable to the persons riding, but injurious to the vehicle, which is entirely unprotected. As these vehicles are usually quite expensive, this lack of protection from the weather has heretofore been a drawback to the use of the same. My improved cover is designed to satisfy this need and is made of sufficient size so as to protect the vehicle itself and also the persons riding in the same. Any suitable waterproof fabric may be employed as the material for the cover.

The cover consists of five parts—a larger front portion A, a smaller rear portion B, a neck-covering C, and two hoods H. All these parts may be stored in folded-up condition in the seat of the vehicle when not in use and are provided with fastening devices, so that they may be fastened together when required for use. The main portion A consists of two longer middle portions $a$, the outer sides of which converge toward the center line as they approach the front of the cover, and two shorter side portions $a'$ $a'$, the outer sides of which likewise converge toward the inner edge of the same, as shown in Fig. 4. The extended ends of the sections $a$ $a$ form a covering-flap $k'$ for the dashboard of the vehicle. To said covering-flap $k'$ are attached fastening-straps $b$ $b'$, which are provided with buckles by which the flap when lapped over the dashboard of the vehicle may be attached thereto, the fastening-straps being buckled at the inner side of the dashboard $k$, as shown in Fig. 3. Suitable fastening devices $c$ $c'$, applied, respectively, to the sides of the covering-flap $k'$ and to the ends of the side portions $a'$, provide means for securing these parts together in the manner shown in Fig. 2.

The main portion A of the cover is provided at the upper edge of the middle sections with neck-recesses $a^2$, which form, in connection with neck-recesses $d^2$ of the rear portion B, openings for the necks of the persons riding in the vehicle. The rear portion B is formed of four parts—two middle portions $d$ and two side portions $d'$—which are stitched together, the middle portions being provided at their upper ends and sides with the male portions $f$ of the fastening devices, while the female portions $f'$ of the fasteners are arranged along the upper edge of the main portion, as shown clearly in Figs. 4 and 5. Any approved fastening devices may be employed. The right-hand middle section of the front portion is provided with a transverse opening $e$, (indicated in dotted lines in Fig. 4,) which serves for introducing the reins to the inside of the cover, while two additional openings $e'$ $e^2$ are arranged, respectively, along the connecting-seam of the right-hand middle section with the adjoining side flap and the seam between the sections $a$ $a$, said openings permitting the passing of the hands to the outside of the cover when desired. The openings are protected by suitable covering-flaps $e^3$, which are made of the same material as the cover.

As the cover is not always used by two persons, but sometimes by one person only, a neck-covering C is provided, which may be applied over either of the neck-openings $a^2$ $d^2$. The neck-covering C is made of larger size than the neck-openings and is provided near its outer edge with the female portions $f^3$ of a suitable fastening device, while the corresponding male portions $f^2$ are applied to the cover near the neck-recesses $a^2$ and $d^2$. The hoods H used with the vehicle-cover are made in any approved manner, they being preferably provided with head-covering portions $h$ and neck-flaps $h'$, which latter are connected together by suitable fasteners $f^4$, so as to be retained on the heads of the wearers; but no connection with the cover is required for the hoods, as the neck portion laps sufficiently over the openings of the covers so as to produce the proper shedding of the rain. The neck-covering flaps C and hoods H are preferably made of the same material as the front and rear portions of the cover.

My improved vehicle-cover is used in the following manner: When two persons are to ride in the vehicle, the dashboard-flap $k'$ is first applied by means of the straps and fasteners $b$ $b'$ $c$ $c'$ to the dashboard $k$. The left-hand flap $a'$ is then connected with the left-hand flap $d'$. The person who is to occupy the left-hand side of the seat takes his place on the seat, and the connection of the fasteners at the upper edge of the main portion with the upper edge of the rear portion to the right-hand neck-opening is then made. If the vehicle is horse-drawn, the reins are then passed through the opening $e$. The person who is to occupy the right-hand side of the seat then gets into the vehicle and connects by the fasteners the upper edge of the right-hand section $a$ and the right-hand side flap $a'$ with the rear portion B, so that the cover is thereby entirely closed around the persons on the seat, while at the same time the vehicle is protected by the side flaps $a'$ and the downwardly-extending rear portion against rain. When the cover is to be used by one person only, the neck-covering is attached in place over the left-hand neck-opening of the cover, as shown in Fig. 2, after which the dashboard-flap is applied and the left-hand ends of the front and rear portions are connected. The person then steps in the vehicle and completes the closing of the cover by fastening the right-hand middle part from the bottom up. In both cases it is preferable to put the hoods on before getting into the carriage, so that the cover can be readily placed below the neck-flaps of the hoods. To facilitate the closing of the neck-flaps of the hoods or the closing of the cover or securing the reins, they slip through the opening $e$. It will sometimes be necessary to extend the hands through the longitudinal slots $e'$ $e^2$ of the main portion.

While the hoods are in use, the hats or head-coverings of the riders may be placed in or beneath the seat, which serves also for the storage of the vehicle-cover and hoods when the same are not required for use. In applying the cover it is convenient to fasten the side flaps $a'$ to the rear portion B from the outer edge or bottom upwardly and in removing the cover to commence at the neck-opening and go toward the edge. The placing in position of the cover and removing and storing of the same after use are readily acquired with but little practice, so that the cover forms a very convenient device for protecting not only the vehicle but also the persons riding in the same against rain or snow.

Having thus described my invention, I claim as new and desire to secure by Letters Patent—

1. A vehicle-cover, consisting of a front portion composed of longer middle sections and shorter side flaps, a rear portion, fastening devices for connecting the adjacent edges of the front and rear portions, and means for connecting the extended ends of the front portion with the dashboard of a vehicle, substantially as set forth.

2. A vehicle-cover, consisting of a front portion having side flaps and a dashboard-flap, a rear portion, fastening devices for connecting the upper edges of the front portion and side flaps with the upper edges and sides of the rear portion, and means for attaching the dashboard-flap of the main portion to the dashboard of a vehicle, substantially as set forth.

3. A vehicle-cover, consisting of a main portion composed of two middle sections and two side flaps, said middle sections being made longer than the side flaps and provided at their upper ends with neck-recesses, a rear portion provided with corresponding recesses, fastening devices for connecting the upper edges of the middle sections and rear edges of the side flaps with the upper edge and sides of the rear portion, means for attaching the front ends of the middle sections of the front portion to the dashboard of a vehicle, a neck-covering, and means for attaching said neck-covering over one of the neck-openings formed by adjoining recesses of the cover, substantially as set forth.

4. A vehicle-cover, consisting of a front portion composed of longer middle sections and shorter side flaps, one of said middle sections being provided with a transverse slot for the reins, longitudinal slots in said front portion for the hands, a rear portion, fastening devices for connecting the adjacent ends of the front and rear portions, and means for connecting the extended ends of the middle sections of the front portion with the dashboard of a vehicle so as to form an overlapping flap, substantially as set forth.

In testimony that I claim the foregoing as my invention I have signed my name in presence of two subscribing witnesses.

FRED. H. WOLFGANG.

Witnesses:
PAUL GOEPEL,
M. H. WURTZEL.